United States Patent [19]
Heirich

[11] Patent Number: 5,806,940
[45] Date of Patent: Sep. 15, 1998

[54] MONITOR HOUSING HAVING REPLACEABLE LID WITH THERMAL VENT

[75] Inventor: Douglas L. Heirich, Redwood City, Calif.

[73] Assignee: Apple Computer, Inc., Cupertino, Calif.

[21] Appl. No.: 753,096

[22] Filed: Nov. 20, 1996

Related U.S. Application Data

[63] Continuation of Ser. No. 456,628, Jun. 1, 1995, abandoned.

[51] Int. Cl.⁶ .............................. A47B 81/06; A47B 47/02
[52] U.S. Cl. ........................... 312/7.2; 312/263; 361/681; 348/836
[58] Field of Search ................................. 312/7.2, 223.2, 312/265.5, 265.6, 263, 264, 140, 293.3; 348/836, 843; 361/681, 682, 683, 685

[56] References Cited

U.S. PATENT DOCUMENTS

| | | | |
|---|---|---|---|
| 3,255,311 | 6/1966 | Hofmeister et al. | 348/843 X |
| 3,284,151 | 11/1966 | Morrison et al. | 220/4.02 X |
| 4,006,300 | 2/1977 | Boldt et al. | 312/7.2 X |
| 4,556,914 | 12/1985 | Vitek et al. | 358/244 |
| 4,657,316 | 4/1987 | Hardt et al. | 348/836 X |
| 4,716,493 | 12/1987 | Zelkowitz | 348/836 X |
| 4,853,790 | 8/1989 | Dickie | 348/836 X |
| 5,033,802 | 7/1991 | Fairbanks | 312/7.2 |
| 5,294,994 | 3/1994 | Robinson et al. | 348/836 X |
| 5,360,263 | 11/1994 | Nakano et al. | 312/263 X |
| 5,363,150 | 11/1994 | Kojima | 348/836 |
| 5,372,415 | 12/1994 | Tisbo et al. | 312/263 X |
| 5,419,629 | 5/1995 | Korinsky | 312/263 |
| 5,450,221 | 9/1995 | Owen et al. | 361/681 X |
| 5,491,611 | 2/1996 | Stewart et al. | 312/263 X |

FOREIGN PATENT DOCUMENTS

| | | |
|---|---|---|
| 3634100 | 10/1988 | Germany . |
| 4103484 | 8/1992 | Germany . |

*Primary Examiner*—James R. Brittain
*Assistant Examiner*—Robert J. Sandy
*Attorney, Agent, or Firm*—Carr & Ferrell

[57] ABSTRACT

A multipiece housing is provided having a mid bucket, an aft bucket secured to the mid bucket, and a replaceable lid fastened to the aft bucket having a thermal vent. The replaceable lid includes a plurality of posts. The posts are inserted against an inner wall of the aft bucket to position and fasten the replaceable lid to the top of aft bucket during assembly. The replaceable lid also includes snap features that clip onto an edge of the mid bucket to further secure the replaceable lid to the bucket. If another replaceable lid having a thermal vent with a different ventilation capacity is desired, a different replaceable lid having a different thermal vent is simply fastened to the same monitor housing.

19 Claims, 7 Drawing Sheets

MONITOR HOUSING HAVING REPLACEABLE LID WITH THERMAL VENT

REFERENCE TO CO-PENDING APPLICATIONS

This application is a continuation application of copending application Ser. No. 08/456,628, filed Jun. 1, 1995, now abandoned and hereby incorporates by reference the following two co-pending applications which include the same inventor:

(1) U.S. patent entitled "Integral Sound Module For A Modular Monitor," having Ser. No. 08/412,704, filed on Mar. 29, 1995, now U.S. Pat. No. 5,689,574; and (2) U.S. patent application entitled "Multipiece Monitor Housing Having Vented Joints," having Ser. No. 08/418,673, filed on Apr. 7, 1995, now U.S. Pat. No. 5,730,512.

BACKGROUND OF THE INVENTION

1. Field of the Invention

The present invention relates generally to the outer housings of computer monitors. More particularly, the present invention relates to constructing the outer housing of a computer monitor to accept a modular top vent.

2. Description of the Related Art

Outer housings or shells for computer monitors conventionally come in a myriad of different shapes and sizes. Monitor housings typically hold and enclose a cathode ray tube (CRT) and the electronic components necessary to drive the display screen of the CRT.

The electronic components necessary to power and control CRT display screens generate a considerable amount of heat. Generated heat must be dissipated in an efficient manner in order to prevent the electronic components from overheating. In order to meet workplace ergonomic requirements in use in many countries, cooling fans with their accompanying noise are not a desirable solution. Generally, CRT monitors use natural convective cooling. Accordingly, it is necessary for the design of the monitor housing to provide such ventilation that will adequately dissipate the heat generated by the electronic components.

Unfortunately, the goals of the aesthetic designer and the needs of the functional designer of monitor housings often conflict. While more ventilation is provided by having a large number of ventilation holes in the monitor housing, a large number of ventilation holes is often not considered aesthetically pleasing.

An increase in the number of ventilation holes has additional negative aspects. For instance, a large number of ventilation holes generally decreases the structural integrity of the housing. An increased number of ventilation holes may also add to the cost per unit of materials, design support, and time to market the housing.

The ventilation requirements of a monitor housing are directly related to the operating power of the internal components contained within the monitor housing. Therefore, monitor components operating at lower dissipated power levels do not require as much ventilation as monitor components operating at higher dissipated power levels. While the ventilation requirements of different power monitor components may vary, these components can generally be contained within relatively similar types of monitor housings. Generally, only the ventilation capacity of the monitor housing requires significant modification to accommodate different power monitor components. Furthermore, simply adding or decreasing the ventilation capability of side vents on a monitor housing is inadequate due to the "chimney effect" of heat dissipation in monitor housings.

Conventional methods for developing monitor housing designs require designers to develop two completely different monitor housings having different ventilation capabilities in order to accommodate monitors having various dissipated power levels. Accordingly, such a method typically results in an expensive design process. Moreover, new tools to produce the different monitor housings must be created, and different parts must be stocked for this conventional manufacturing process. Creating new monitor housings is relatively expensive due to the use of the injection molding process and using molds which are expensive to create.

Referring now to FIG. 1, illustrated is a left outside view of a prior art monitor housing 10. The prior art monitor housing 10 includes a main section 12 and a rounded base 18 which rests upon a seat 20. The base 18 may be rotated within the seat 20 in order to rotate and position a display screen of the monitor housing 10 at a desired angle.

As shown in FIG. 1, the main section 12 is an integral unit and does not include replaceable parts. Thermal vents 21 are included in the main section 12, but the thermal vents 21 are molded into the main section 12 and cannot be removed or altered. Therefore, in order for the thermal vents 21 to be modified, a completely new monitor housing 10 must be designed. This is typically a costly procedure and a problem with prior art monitor housing designs.

Accordingly, there is a need to develop a monitor housing which can be modified for a relatively inexpensive cost in order to accommodate monitors with varying dissipated power levels.

SUMMARY OF THE INVENTION

The present invention overcomes the problems and shortcomings of the prior art by providing a monitor housing having a replaceable lid with a thermal vent. In particular, the present invention provides a monitor housing having a replaceable lid with a thermal vent that can be replaced with a different replaceable lid having a thermal vent with a greater or reduced ventilation capability. In this manner, a monitor housing can be quickly and cheaply modified to accommodate different electronic components having different ventilation requirements.

The preferred embodiment of the present invention provides a multipiece housing for a monitor having a mid bucket, an aft bucket secured to the mid bucket, and a replaceable lid with a thermal vent fastened to the aft bucket. The replaceable lid includes a plurality of posts which position and secure the replaceable lid to the aft bucket. The posts are inserted against an inner wall of the aft bucket to position the replaceable lid to the top of the aft bucket during assembly. The replaceable lid also includes snap features which clip onto an edge of the mid bucket to secure the replaceable lid to the mid and aft buckets.

The method of the present invention comprises the steps of providing a monitor housing configured to receive a replaceable lid, determining a ventilation capacity required for a set of components to be placed within the monitor housing, and fastening a replaceable lid having a vent with a predetermined ventilation capacity to the monitor housing based on the required ventilation capacity determined for the components to be placed within the monitor housing. In this manner, the method of the present invention enables a monitor housing to be efficiently modified to provide increased or decreased ventilation capability for new components to be contained within the monitor housing.

DESCRIPTION OF THE PREFERRED EMBODIMENT

Figure 1:
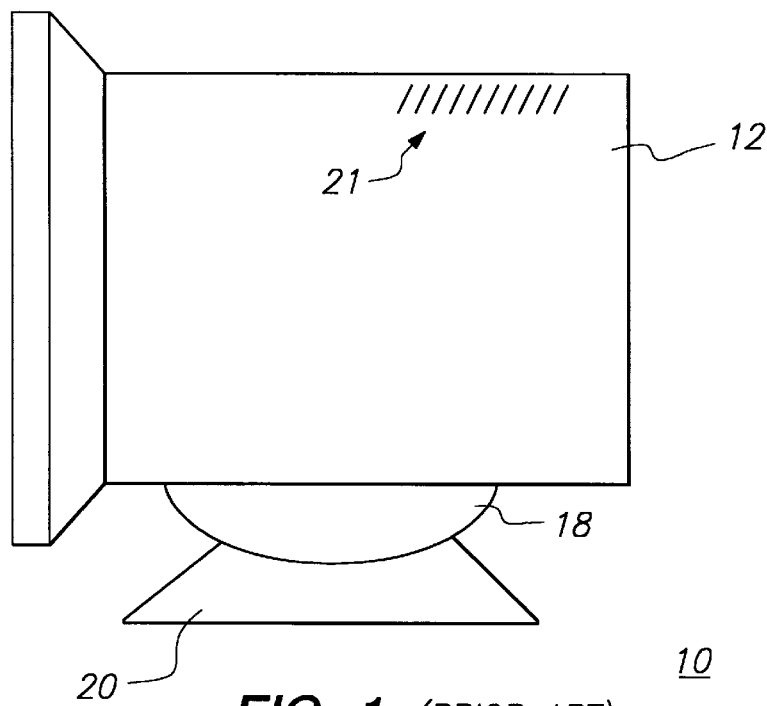
FIG. 1 is a side view of the outer left side of a housing of a CRT monitor configured according to the prior art.
Figure 2:
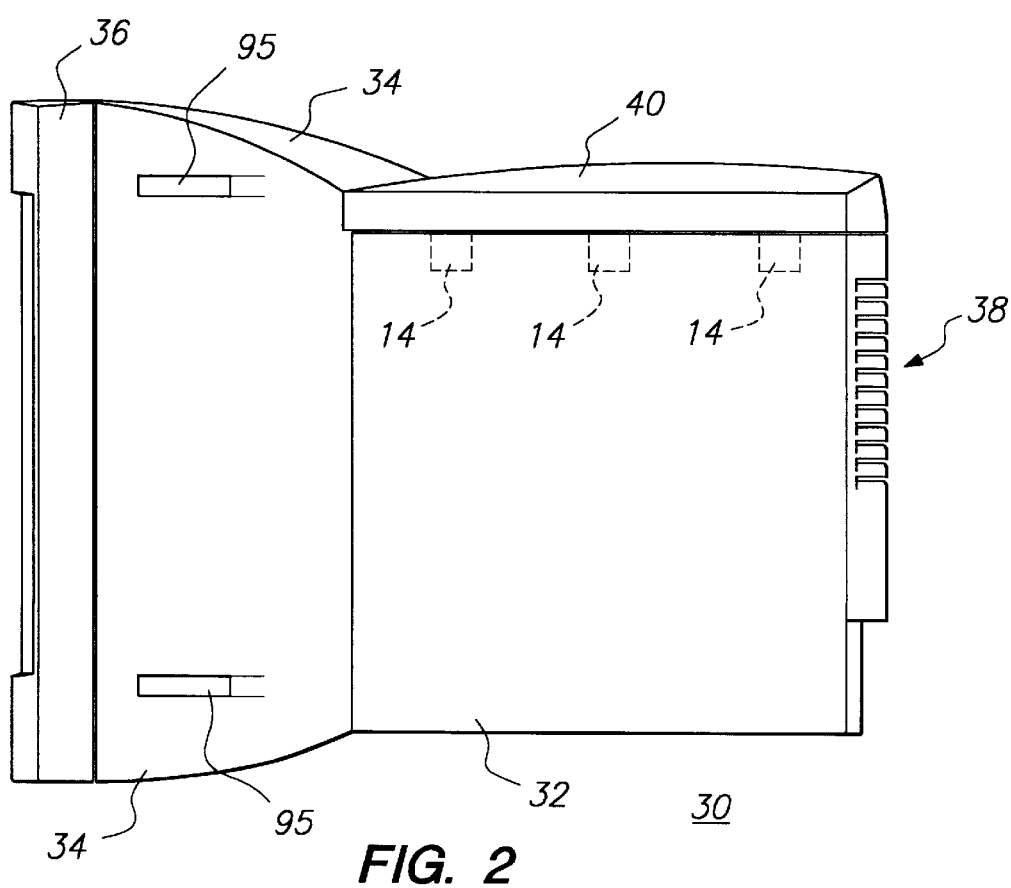
FIG. 2 is a perspective view of the outer left side of a first and preferred embodiment of a monitor housing configured in accordance with the present invention.

Referring to FIG. 2, illustrated is a perspective view of a left outer side of a first and preferred embodiment of a monitor housing 30 configured in accordance with present invention. The monitor housing 30 includes an aft bucket 32 and a mid bucket 34. A bezel 36 is attached to the front of the mid bucket 34. The aft bucket 32 defines along its rear wall a row of air slits 38 which provide ventilation for electronic components contained within the monitor housing 30.

In accordance with the present invention, a separate and replaceable lid 40 having a thermal vent is included as part of the housing 30 and is positioned on top of the aft bucket 32. Posts 14, which are illustrated in shadow, are attached to and extend from the bottom of the replaceable lid 40 and are utilized to position and secure the replaceable lid 40 to the aft bucket 32. The posts 14 fit against an inside wall of the aft bucket 32 to position and secure the replaceable lid 40 to the aft bucket 32.

Figure 3:
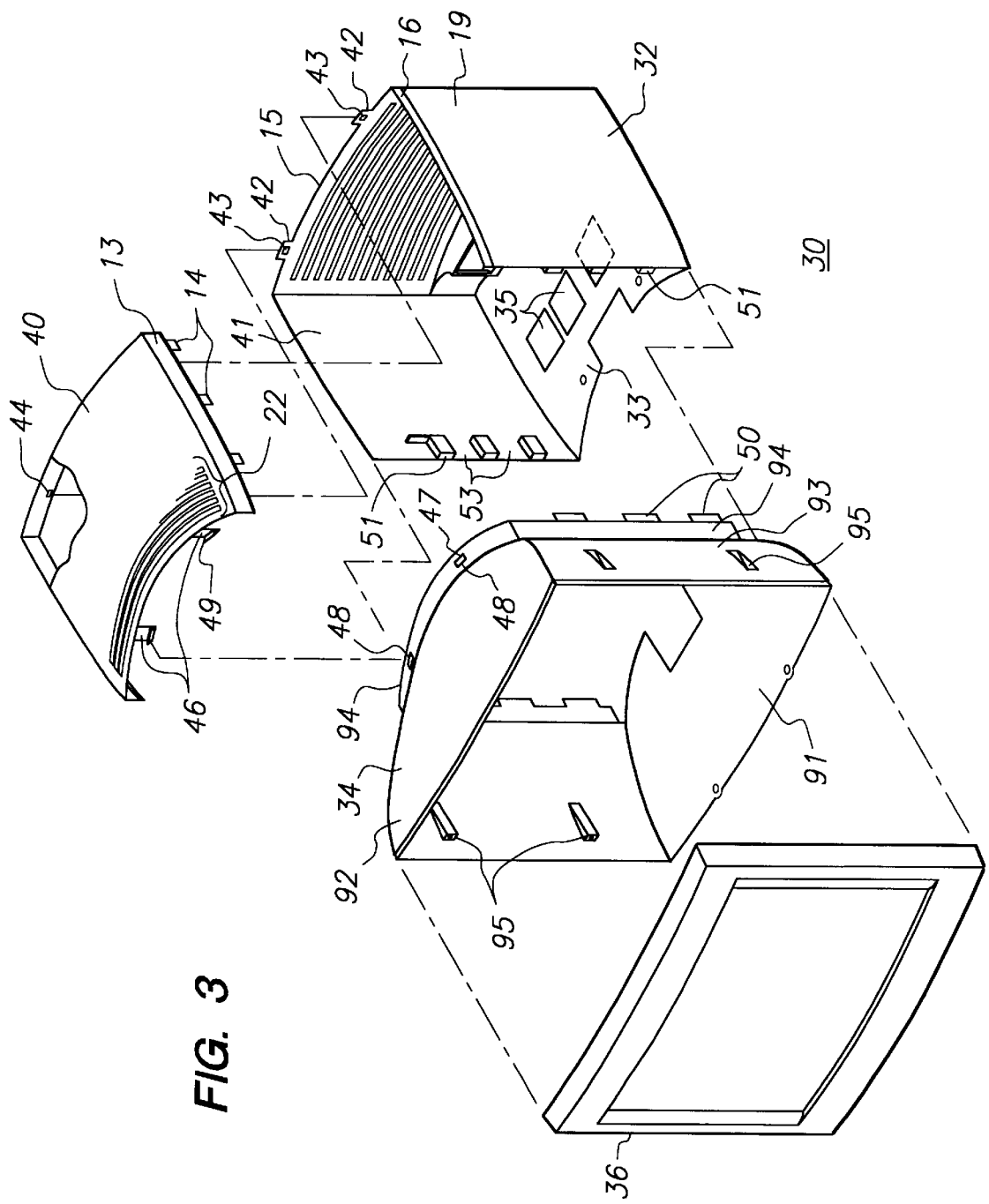
FIG. 3 is an exploded perspective view of the first and preferred embodiment of the monitor housing shown in FIG. 2.

Referring to FIG. 3, illustrated is an exploded perspective view of the first and preferred embodiment of the monitor housing 30 shown in FIG. 2. Illustrated are the bezel 36, the mid bucket 34, the aft bucket 32, and the replaceable lid 40 having a thermal vent 22. The aft bucket 32, the mid bucket 34, the bezel 36, and the replaceable lid 40 are each preferably constructed as single pieces of hardened plastic using an injection molding process. The aft bucket 32 preferably has a generally rectangular box shape. The aft bucket 32 includes a bottom 33, a left side wall 19, a right side wall 41, and a rear wall 15. The left wall 19, the bottom 33, and the right wall 41 have a generally planar shape. The rear wall 15 has a generally concave shape. The top edges of the left side wall 19 and the right side wall 41 are reduced in thickness proximate to the top to create a recessed edge 16 that mates with a corresponding space 11 formed in the replaceable lid 40 (FIG. 4B). The bottom 33 includes rectangular openings 35 which enable air and electrical wiring to enter into the aft bucket 32. The aft bucket 32 includes a pair of projection members 42 spaced apart along the top edge of the rear wall 15. The projection members 42 extend upward and define rectangular apertures 43 in which corresponding tab protrusions 44 of the replaceable lid 40 are positioned. By inserting the tab protrusions 44 into the corresponding apertures 43 during assembly of the monitor bucket 30, the rear end of the replaceable lid 40 is secured to the aft bucket 32. The aft bucket 32 further includes teeth 51 attached to the inside of the front end of the left wall 19 and the right wall 41. The teeth 51 define spaces 53 for receiving similar shaped teeth 50 that are on the rear edge of the mid bucket 34.

Figure 4A:
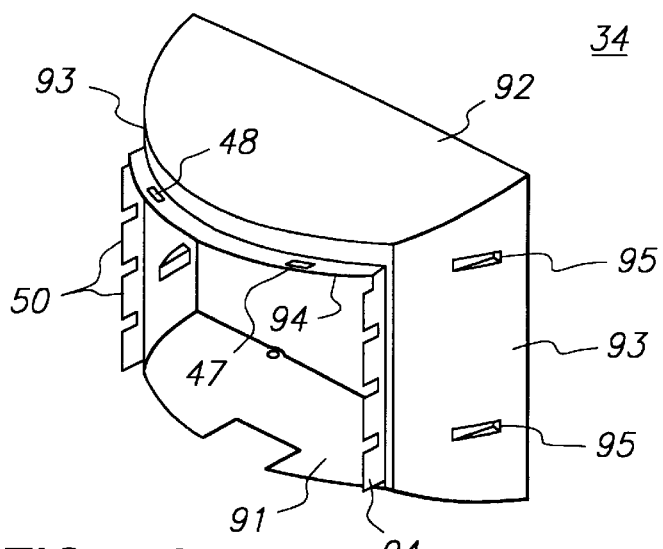
FIG. 4A is rear perspective view of the first and preferred embodiment of the mid bucket shown in FIG. 3.
Figure 4B:
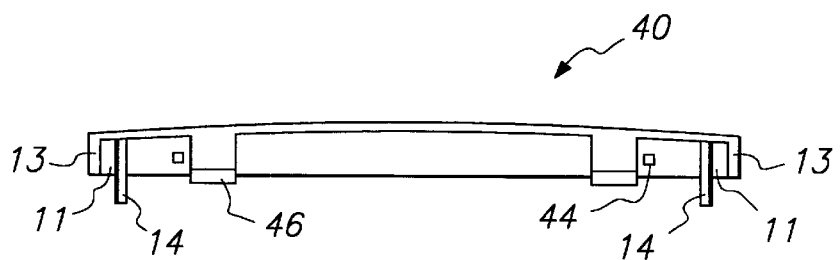
FIG. 4B is a front end view of the first and preferred embodiment of the replaceable lid shown in FIG. 3.
Figure 4C:
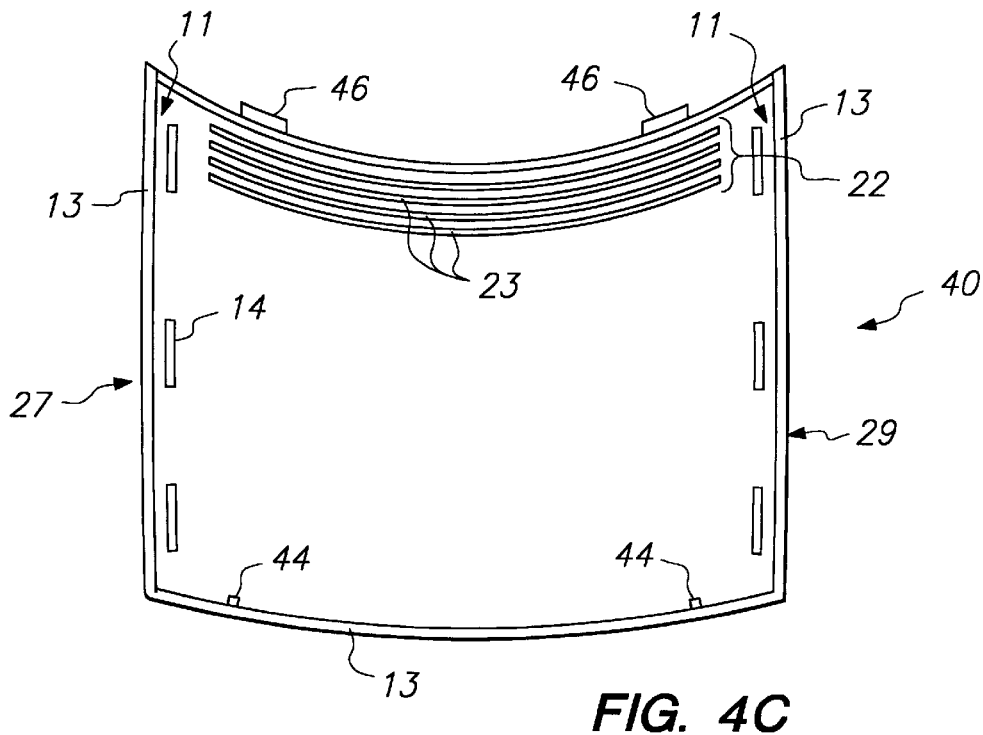
FIG. 4C is a bottom plan view of the first and preferred embodiment of the replaceable lid shown in FIG. 3.

Referring to FIGS. 3 and 4A, the mid bucket 34 preferably has a generally semi-cylindrical shape formed from a bottom 91, side walls 93, and a top 92. Each of the side walls 93 defines a pair of cavities 95 positioned intermediate the top 92 and the bottom 91. The cavities 95 extend longitudinally, and provide an area for inserting a fastening means such as a screw to attach the bezel 36 to the mid bucket 34. The bottom 91, top 92, and side walls 93 each have a cantilevered band member 94 that extends to the rear and forms a generally square shape. The top 92 and bottom 91 portions of the band member 94 have an arcuate shape. Along the interior side of the band members 94 for the side walls 93, a plurality of teeth 50 are positioned vertically spaced apart. The teeth 50 of the mid bucket 34 mate with the teeth 51 of the aft bucket 32.

Referring to FIGS. 3, 4A–4C, the replaceable lid 40 of the first and preferred embodiment is illustrated. The replaceable lid 40 is generally planar in shape. The top of the replaceable lid 40 includes a vent 22 defining a plurality of slits 23. The vent 22 preferably has the structure and slit arrangement shown in FIG. 4C, however, those skilled in the art will recognize that alternate embodiments of slits 23 may be used. The vent 22 in the illustrated embodiment is positioned towards the front of the replaceable lid 40. The replaceable lid 40 further includes a lip 13 which extends downward along the sides and rear of the replaceable lid 40. The lip 13 and defined space 11 mate with the recessed edge 16 of the aft bucket 32.

Six posts 14 are illustrated, three on each side of the replaceable lid 40. The posts 14 are proximate to the lip 13 of the replaceable lid 40 and spaced apart along the sides 27 and 29 of the replaceable lid 40. The posts 14 extend parallel to the lip 13 and form a space 11 between the outer lip 13 and the posts 14. During assembly, the recessed edge 16 of the aft bucket 32 is positioned in space 11 between the outer lip 13 and the posts 14 to correctly position the thermal vent lid 40 onto the aft bucket 32.

The replaceable lid 40 also includes snap features 46 on the front of the replaceable lid 40. The snap features 46 are spaced apart at the front of the replaceable lid 40 and extend downward parallel to the posts 14. The snap features 46 are preferably formed as an integral part of the replaceable lid 40. The snap features 46 each include an edge 49 which clips onto an edge 47 of rectangular apertures 48 defined in the band 94 of the mid bucket 32. During assembly of the monitor housing 30, the snap features 46 are inserted into the apertures 48 and clip onto edges 47 of the apertures 48, thereby fastening the replaceable lid 40 to the mid bucket 34.

Figure 5A:
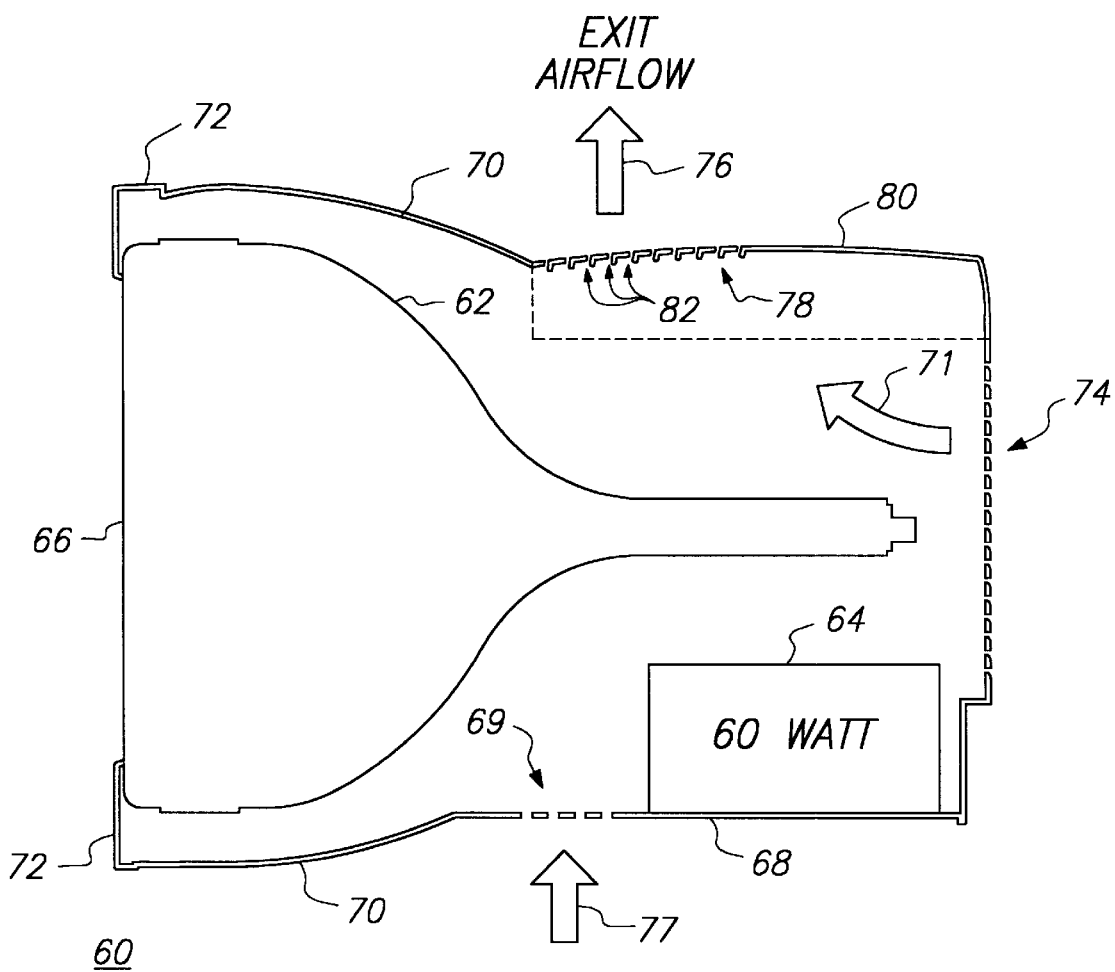
FIG. 5A is a schematic view of second embodiment of a monitor housing configured accordance with the present invention.

Referring to FIG. 5A, illustrated is a schematic view of a monitor housing 60 configured in accordance with a further preferred embodiment of the present invention. Enclosed within the monitor housing 60 is a CRT 62 and a 60-watt power source 64. The CRT 62 includes a display screen 66 positioned at the front of the monitor housing 60. The monitor housing 60 is composed of an aft bucket 68, a mid bucket 70, and a bezel 72. A row of air vents 74 is included at the rear of the aft bucket 68.

In accordance with the present invention, a separate, replaceable lid 80 is fastened to the aft bucket 68 and the mid bucket 70 in the manner previously discussed with reference to FIGS. 2–4C. A portion of the replaceable lid 80 is shown in shadow to emphasize that the replaceable lid 80 is a separate and removable element of the monitor housing 60. The replaceable lid 80 is illustrated having a vent 78 defining a plurality of individual slits 82 in the front of the replaceable lid 80.

An arrow 76 illustrates the exit airflow through the vent 78 of the replaceable lid 80. Arrow 71 illustrates the entrance of external air through the rear vent 74, and arrow 77 illustrates the entrance of external air through the bottom vent 69. Heat generated by the nominally 60-watt source 64 escapes through the vent 78 in order to provide ventilation and prevent overheating of the internal components of the monitor housing 60. The vent 78 of the replaceable lid 80 includes approximately ten slits 82. The replaceable lid 80 provides the ventilation necessary to dissipate heat generated by the CRT 62, the 60-watt power source 64, and other internal components of the monitor housing 60.

Figure 5B:
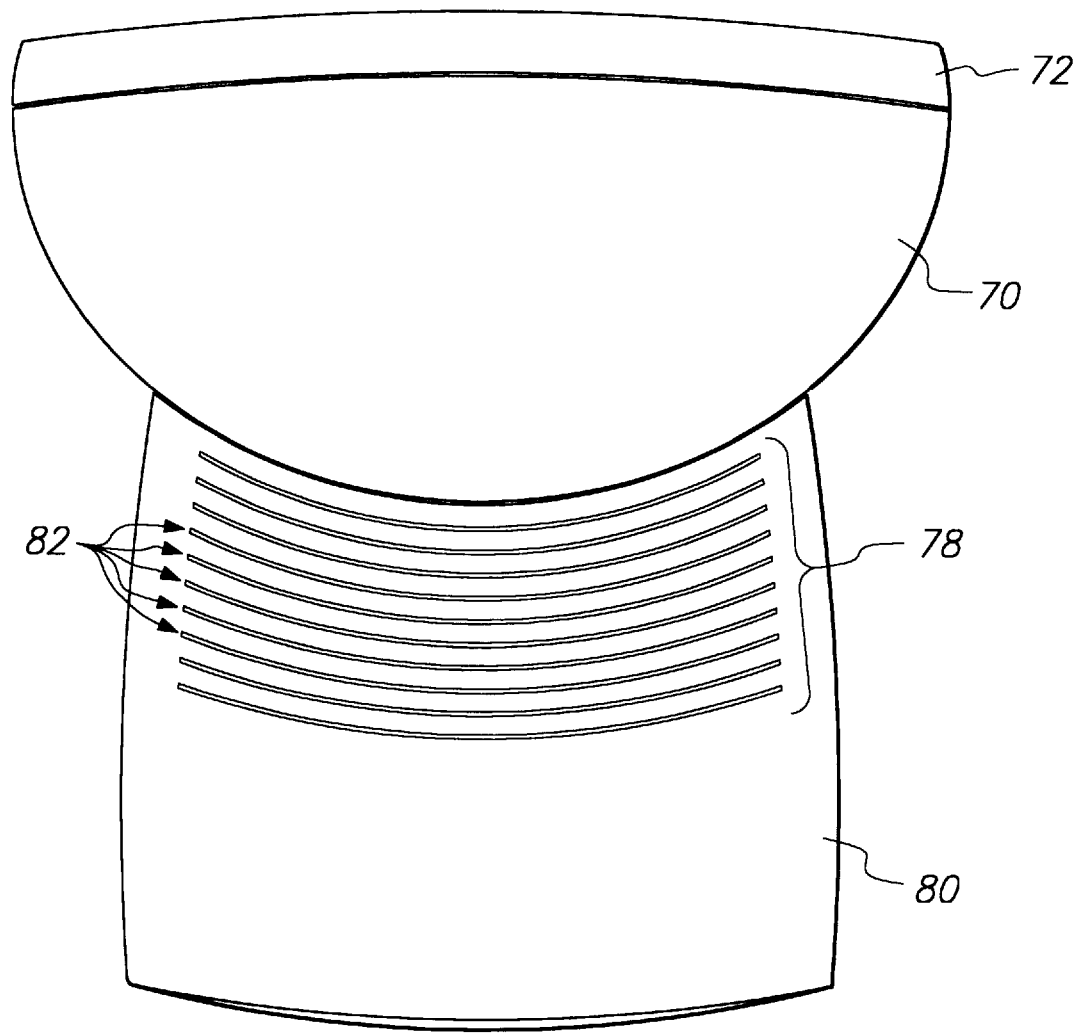
FIG. 5B is a top plan view of the monitor housing shown FIG. 5A.

Referring to FIG. 5B, illustrated is a top plan view of the monitor housing 60 shown in FIG. 5A. Illustrated are the bezel 72, the mid bucket 70, and the replaceable lid 80. Also illustrated is the thermal vent 78 positioned at the front of the replaceable lid 80, the vent 78 defining individual slits 82. As shown in FIG. 5B, the number of individual slits 82 in the replaceable lid 80 is about 10, which provides a first level of ventilation capacity.

Now, assume it is desired to install components dissipating more heat into the monitor housing 60. Conventional practice would require a completely new monitor housing, having an increased ventilation capacity, to be designed and produced to accommodate a higher voltage power supply. Utilizing the present invention, however, the monitor housing 60 can be quickly and cheaply modified to accommodate greater dissipated heat by simply replacing the replaceable lid 80 with a new replaceable lid that provides increased ventilation.

Figure 6A:
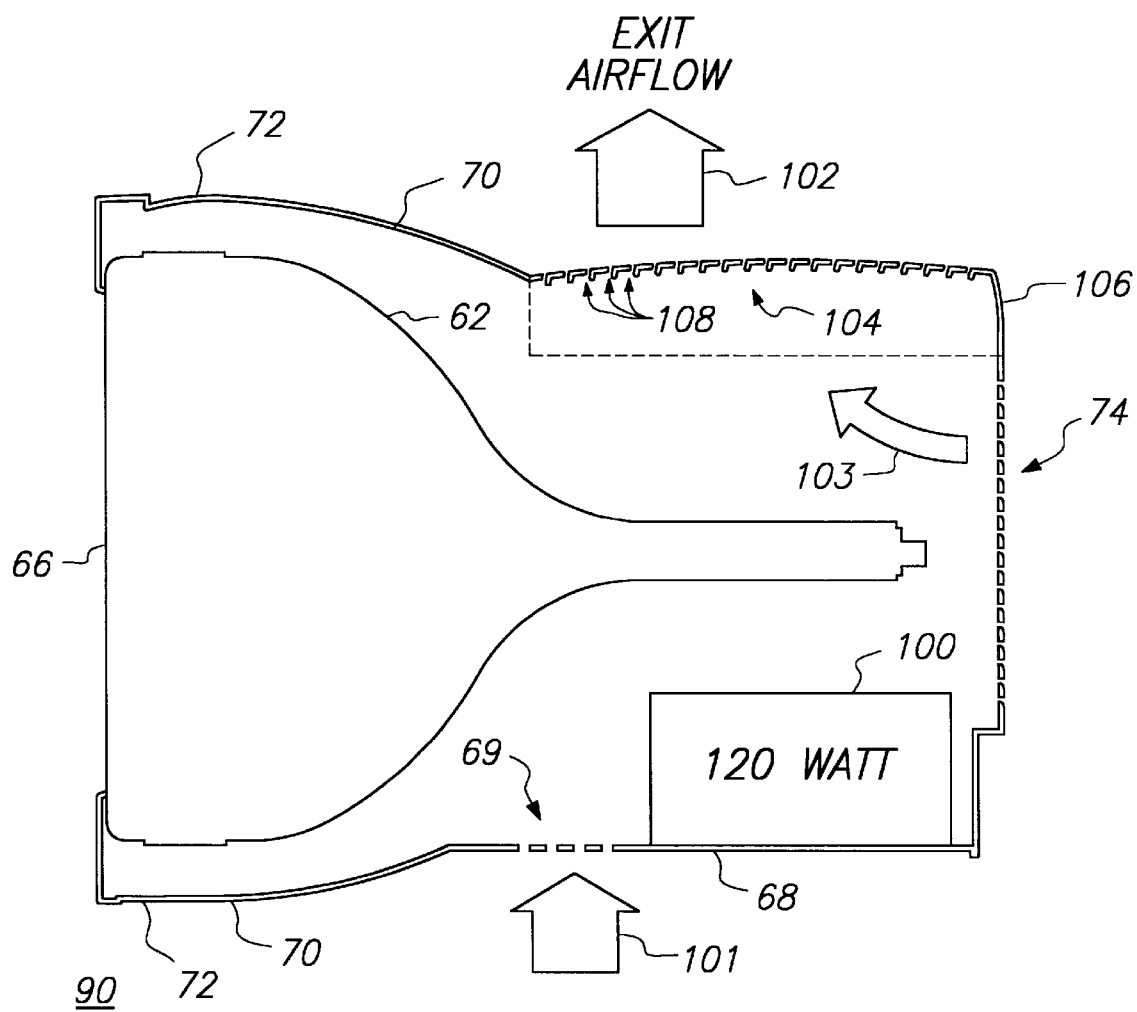
FIG. 6A is a schematic view of a third embodiment of a monitor housing configured in accordance with the present invention.

Referring to FIG. 6A, illustrated is a schematic view of a monitor housing 90 configured in accordance with the present invention. The monitor housing 90 is identical to the monitor housing 60 illustrated in FIG. 5A, except the monitor housing 90 illustrated in FIG. 6A has a 120-watt power supply 100 and a different replaceable lid 106.

The monitor housing 90 includes the aft bucket 68, the mid bucket 70, and the bezel 72, which are identical to the respective components of the monitor housing 60 of FIG. 5A. The monitor housing 90 in FIG. 6A, however, contains components nominally dissipating 120 watts, such as the 120-watt power supply 100 and the CRT 66. As expected, this requires additional ventilation capacity to dissipate the additional generated heat. This replaceable lid 106 includes a vent 104 defining approximately 20 individual slits 108, as illustrated in FIG. 6A. The increased number of individual slits 108 provides increased ventilation necessary for the 120-watt power supply 100. Large arrow 103 illustrates increased air flow entering the monitor housing 90 through rear vent 74, and large arrow 101 illustrates increased air flow entering the monitor housing 90 through bottom vent 69. The additional amount of airflow and ventilation capacity required to ventilate the components are illustrated by the large arrow 102 illustrating air escaping though the top vent 104 of the replaceable lid 106, which provides additional ventilation capacity.

In accordance with the present invention, the monitor housing 60 and the monitor housing 90 are identical except for the different replaceable lids 80 and 106. According to the present invention, only the replaceable lid 80 needs to be replaced with a different replaceable lid 106 having more individual slits 108 to provide additional ventilation capacity for the monitor housing 60. In another example, the number of slits may not change, but their cross-section and consequent air flow resistance might change. A new replaceable lid having a different thermal vent also may be used to decrease ventilation capacity.

Figure 6B:
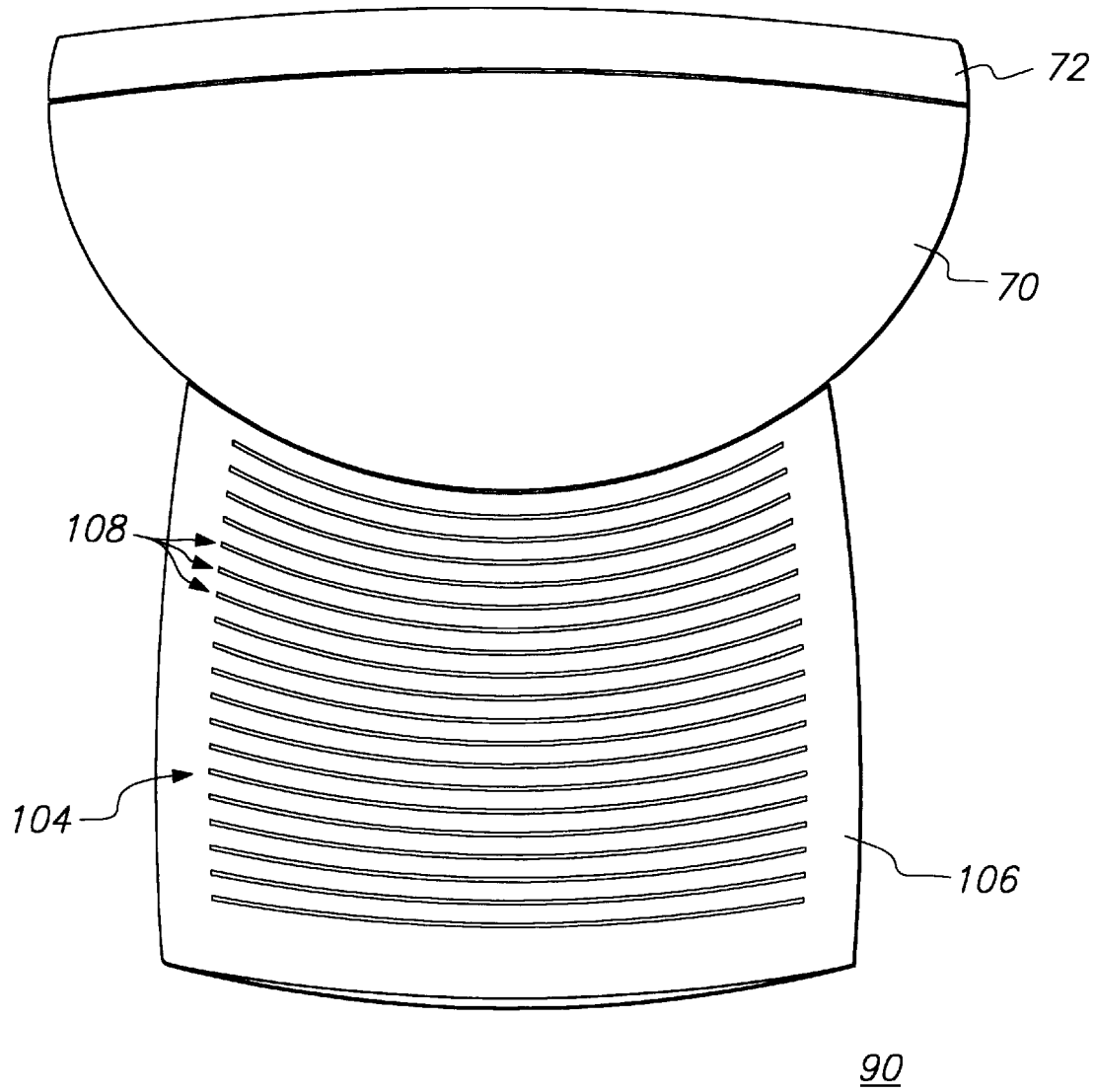
FIG. 6B is a top plan view of the monitor housing shown in FIG. 6A.

Referring now to FIG. 6B, illustrated is a top plan view of the replaceable lid 106 illustrated in FIG. 6A. The slits 108 defined by the air vent 104 are shown. While the replaceable lid 106 provides increased ventilation by providing more slits 108, it should also be noted that the replaceable lid 106 may be replaced with a different replaceable lid simply to provide a different aesthetic design.

In summary, the above description has disclosed a multipiece housing that may be quickly and cheaply modified to provide additional or decreased ventilation capacity by replacing a replaceable lid having a thermal vent on the monitor housing.

While the invention has been described in connection with a preferred embodiment, there is no intent to limit the invention to that embodiment. On the contrary, the intent is to cover all alternatives, modifications and equivalents included within the spirit and scope of the invention as defined by the appended claims.

I claim as my invention:

1. A method for modifying a multipiece housing of a monitor, comprising the steps of:

providing a monitor housing including a mid bucket having a band member with a structure defining at least one tooth, and an aft bucket secured to the mid bucket and configured to receive a replaceable lid having a thermal vent;

selecting a first set of components having a ventilation requirement to be placed within the monitor housing; and fastening a first replaceable lid, having a thermal vent with a predetermined ventilation capacity, to the aft bucket of said monitor housing based on the ventilation requirement of said first set of components to be placed within said monitor housing;

wherein the replaceable lid includes a snap feature that fastens onto an edge of the monitor housing.

2. The method as defined in claim 1, further comprising the steps of:

replacing the first set of components with a second set of components having a different ventilation requirement; and replacing the first replaceable lid with a second replaceable lid having a thermal vent with a second ventilation capacity required by the second set of components to be placed within the monitor housing.

3. A method for modifying a multipiece housing of a monitor, comprising the steps of:

providing a monitor housing including a mid bucket having a band member with a structure defining at least one tooth, and an aft bucket secured to the mid bucket and configured to receive a replaceable lid having a thermal vent;

selecting a first set of components having a ventilation requirement to be placed within the monitor housing; and fastening a first replaceable lid, having a thermal vent with a predetermined ventilation capacity, to the aft bucket of said monitor housing based on the ventilation requirement of said first set of components to be placed within said monitor housing;

wherein the monitor housing includes a projection member defining an aperture, and the replaceable lid includes a tab sized to be inserted into the aperture to fasten the replaceable lid to the monitor housing.

4. The method as defined in claim 3, wherein the replaceable lid includes a snap feature that fastens onto an edge of the monitor housing.

5. The method as defined in claim 1, wherein the fastening step includes clipping a snap feature on the replaceable lid around an edge on the monitor housing.

6. The method as defined in claim 1, wherein the snap feature is positioned at the front of the replaceable lid.

7. A multipiece housing, comprising:

means for housing a monitor including a mid bucket having a band member with a structure defining at least one tooth, and an aft bucket secured to the mid bucket and configured to receive a replaceable lid;

component means having a predetermined ventilation requirement, for placement within said means for housing; and means for fastening a replaceable lid with a predetermined ventilation capacity to said aft bucket based on said predetermined ventilation requirement of said component means;

wherein the means for fastening include a snap feature on the replaceable lid that clips onto an edge of said mid bucket.

8. A multipiece housing, comprising:

means for housing a monitor including a mid bucket having a band member with a structure defining at least one tooth, and an aft bucket secured to the mid bucket and configured to receive a replaceable lid;

component means having a predetermined ventilation requirement, for placement within said means for housing; and means for fastening a replaceable lid with a predetermined ventilation capacity to said aft bucket based on said predetermined ventilation requirement of said component means;

wherein the means for fastening include a post on the bottom of the replaceable lid which fits against inside walls of said mid bucket to securely and accurately position the replaceable lid to the means for housing.

9. A multipiece housing for a monitor, said housing comprising:

a mid bucket having a band defining at least one band tooth; and an aft bucket secured to said mid bucket and having a top side capable of receiving a snap-replaceable lid;

wherein said aft bucket includes at least one bucket tooth for engaging said at least one band tooth, at least one projection member with a projection opening, and an aft structure defining a plurality of air slots.

10. The multipiece housing of claim 9 wherein said mid bucket includes a structure defining a first perimeter and a second perimeter and side walls tapering from said first perimeter to said second perimeter.

11. The multipiece housing as defined in claim 9 additionally comprising a lid releasably secured to said aft bucket.

12. The multipiece housing is defined in claim 11 wherein said aft bucket includes at least one bucket tooth for engaging said at least one band tooth; at least one projection member with a projection opening; and an aft structure defining a plurality of air slots.

13. The multipiece housing as defined in claim 11 wherein said lid includes at least one snap for engaging said band; a tab protrusion for engaging said projection opening of said projection member; and a plurality of posts for fitting against an inside wall of said aft bucket to position and assist in fastening said lid to said aft bucket.

14. The multipiece housing as defined in claim 13 wherein said lid additionally includes a thermal vent and a lip generally parallel to said plurality of posts and spaced from said plurality of posts.

15. The multipiece housing of claim 11 wherein said mid bucket includes a structure defining a first perimeter and a second perimeter and side walls tapering from said first perimeter to said second perimeter.

16. The multipiece housing as defined in claim 15 wherein said lid includes at least one snap for engaging said band; a tab protrusion for engaging said projection opening of said projection member; and a plurality of posts for fitting against an inside wall of said aft bucket to position and assist in fastening said lid to said aft bucket.

17. The multipiece housing as defined in claim 16 wherein said lid additionally includes a thermal vent and a lip generally parallel to said plurality of posts and spaced from said plurality of posts.

18. The multipiece housing as defined in claim 11 wherein said lid includes at least one snap for engaging said band; a tab protrusion for engaging said projection opening of said projection member; and a plurality of posts for fitting against an inside wall of said aft bucket to position and assist in fastening said lid to said aft bucket.

19. The multipiece housing as defined in claim 18 wherein said lid additionally includes a thermal vent and a lip generally parallel to said plurality of posts and spaced from said plurality of posts.

* * * * *